United States Patent [19]
Kroll

[11] Patent Number: 4,811,156
[45] Date of Patent: Mar. 7, 1989

[54] MEDICAL CURRENT LIMITER

[75] Inventor: Mark W. Kroll, Minnetonka, Minn.

[73] Assignee: Cherne Medical, Inc., Minneapolis, Minn.

[21] Appl. No.: 160,717

[22] Filed: Feb. 26, 1988

[51] Int. Cl.$^4$ ............................................. H02H 3/087
[52] U.S. Cl. ........................................ 361/58; 361/91; 361/101; 128/696
[58] Field of Search ................... 361/56, 58, 88, 91, 361/93, 100, 101; 128/696

[56] References Cited

U.S. PATENT DOCUMENTS 4,546,401 10/1985 Suederg .............................. 361/91

Primary Examiner—Derek S. Jennings
Attorney, Agent, or Firm—Anthony G. Eggink

[57] ABSTRACT

The medical current limiting circuit is for use with medical electrodes and associated diagnostic and therapeutic apparatus. The device protects the apparatus and patient from current flow. The device has circuitry comprising a pair of external connectors, a pair of n-type field effect transistors connected in cascade, a resistor, a p-type field effect transistor, a capacitor to latch the p-FET in a non-conductive state upon its initial activation and a diode to prevent capacitor discharge to the current source.

6 Claims, 2 Drawing Sheets

MEDICAL CURRENT LIMITER

BACKGROUND OF THE INVENTION

This invention relates to a device for limiting current, and more particularly, to a medical current limiting circuit. The device is useful for protecting medical electrical apparatus and patients being monitored by electrocardiographic equipment from possible current flow caused by the patient's contact with an outside current source or by a failure in the amplifier section of the equipment.

In the past, a variety of devices have been utilized to limit current flow. The classical method involves placing a large resistor in series with the current source and the load. This method is undesireable for medical diagnostic applications because large resistors add "Johnson noise" which interferes with subsequent signal analysis. Phase shifts, frequency distortions, amplifier current noise and loss of common-mode rejection capabilities also result from the use of a large series resistance.

One prior art device utilizes a pair of field effect transistors (FET), connected in series with a small resistance in between to limit current. However, this device is ineffective at limiting current to desired medically safe levels, for example under 20 micro-amps, without the use of large resistors. Another problem with this device is that, upon sensing an overload, it limits current to a fixed maximum value which is independent of the applied voltage, as opposed to dropping the current to a very low idle level, for example under 4 micro-amps.

Another current limiter device utilizes a pair of exterior n-type FETs (n-FET) in series with a p-type FET (p-FET) placed in between. This device is used for logic in computers. The p-FET is controlled by an external voltage connected to its gate, and thus acts as a voltage controlled variable resistor. The requirement of an external control voltage renders this device unusable for fail-safe applications such as patient protection.

Yet another device has an n-FET and a p-FET connected in series. Due to polarity changes in alternating current (a.c.) circuits, or voltage variations in a pulsating direct current (d.c.) circuit, a device such as this repeatedly switches on and off and must be re-educated at each successive cycle as to the existence of excess current. Thus, its average current is unacceptably high and signal transients are introduced into the system.

Despite the need for a current limiting device which is usable for patient protection in electro-medical diagnostic and therapeutic applications, and which overcomes prior art problems and limitations, none insofar as is known has been proposed or developed.

Accordingly, it is an object of the present invention to provide a device that is an inexpensive and compact fail-safe current limiter which is usable with modern medical electrodes and associated diagnostic and therapeutic apparatus to protect a patient from accidental electrical shock. It is a further object of this invention to provide a device which does not introduce deleterious Johnson noise, phase shifts, frequency distortions or amplifier current noise into the signal analysis process, and which does not cause a loss of common-mode rejection capabilities.

Another object of this invention is to provide a device which shuts off current flow to a very low idle current, for example less than 20 micro-amps, upon detection of a current overload and which is self-resetting. Another object of this invention is to provide a device which latches its idle current to ride out successive cycles of a.c. polarity change or pulsating d.c. voltage variations without repeatedly switching on and off.

SUMMARY OF THE INVENTION

The medical current limiting circuit is for use with medical electrodes and associated diagnostic and therapeutic apparatus. The device protects patients and apparatus from potential accidental current overload caused by failures in the amplifier isolation section of diagnostic and therapeutic apparatus, short circuits, or patient contact with external current sources.

The device has a circuit comprising a pair of n-FETs, a resistor, a p-FET, a capacitor to latch the p-FET in an activated, non-conductive state upon its initial activation and a diode to prevent the capacitor charge from being drained to the current source. The n-FETs, resistor and p-FET are connected in series to one another in consecutive order from the current source to the return or ground. The n-FET gates are connected to the return side of the circuit. The gates are protected from voltage breakdown by a resistor in series with the connection. The p-FET gate is connected to the current source side of the circuit. This gate is also protected by a series resistor. The capacitor is connected in parallel between the p-FET gate and the p-FET source terminal.

The n-FETs sense voltage drops that result from excess current passing through the resistor. They switch off to limit current to a low idle level. They are arranged in a cascade system to provide positive feedback which speeds switch-off. The p-FET is provided to quickly sense positive voltage at the beginning of the network without relying on intra-network voltage drops.

The capacitor stores positive charge supplied by the initial current overload and maintains the charge on the p-FET gate to hold or latch the p-FET channel in a depleted, non-conducting state during voltage variations caused by pulsating d.c. The diode is connected between the capacitor connection to the p-FET gate and the current source to prevent charge from the capacitor from being drained to the current source connection and to the patient.

Preferably, an identical set or section of the above-mentioned elements are arranged in a symmetrical "back-to-back" fashion to provide a circuit having bi-directional pulsating direct current limiting and alternating current limiting capabilities.

The device provides inexpensive, compact, fail-safe protection for the patient from dangerous current. The device provides such current limiting qualities without the use of large series resistance. Therefore, the device does not introduce undesirable noise, phase shifts, frequency distortions or amplifier current noise. Also, loss of common-mode rejection capabilities is minimized. The device shuts off current flow to a very low level and is automatically self-resetting. Also, the latching feature of the device allows it to ride out successive cycles of a.c. changes in polarity and pulsating d.c. voltage variations which provides a low average current and reduces signal transients.

These and other benefits of this invention will become clear from the following description, by reference to the drawings.

DESCRIPTION OF THE PREFERRED EMBODIMENTS

Figure 1:
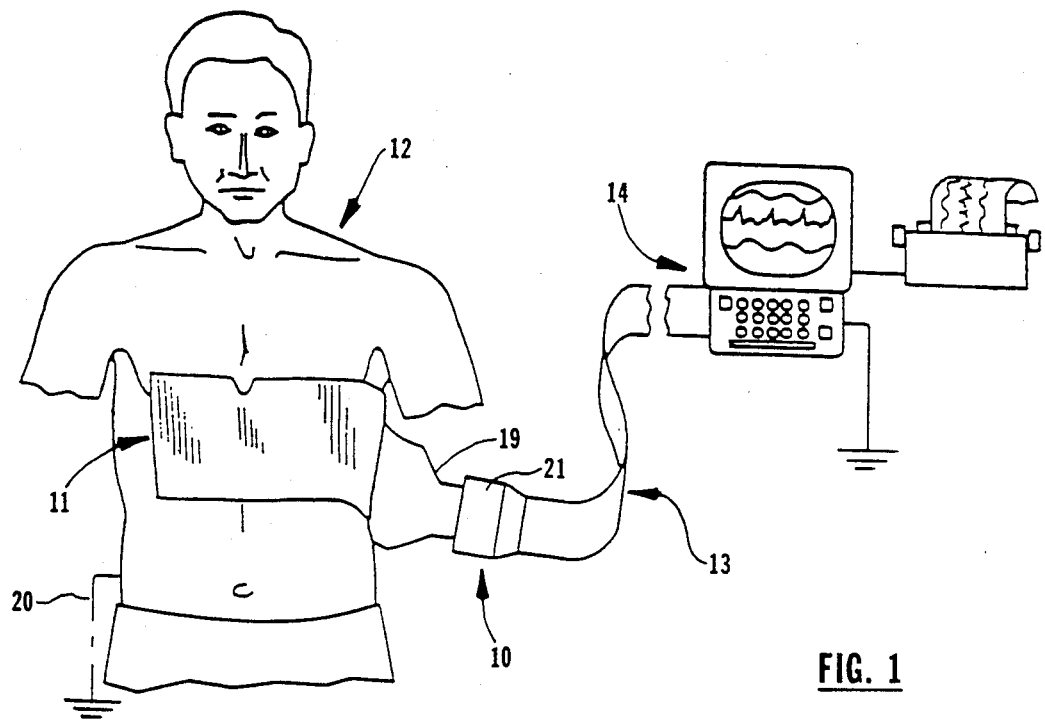
FIG. 1 shows a medical electrode assembly being used on a patient to transmit bio-electric signals to an electro-medical apparatus, wherein the device of the present invention is incorporated into the connector between the electrode device and the cable set.

FIG. 1 shows a connector housing 21 for holding and maintaining the device 10 of the present invention in an operative position. Device 10 is shown connected in line with a cable set 13 which extends between a medical electrode assembly 11 and an electronic medical diagnostic or therapeutic apparatus 14. The device has circuitry designed to protect or limit current flow to the patient 12 and to the electronic medical apparatus 14 through the attached electrodes 11 and cable set 13. Examples of causes of such current flow may include a failure in the amplifier section or like components in the electronic medical apparatus 14 while the patient is in contact with a ground 20, or by patient 12 or electrode 11 contact with outside current sources in the clinical environment. The former example would lead to current flow from the apparatus 14 through the cable set 13 and into the grounded patient 12, while the latter examples would involve current flow from the patient 12 or electrode assembly 11, through the cable set 13 and into the grounded apparatus 14. The device 10 is thus preferably provided with circuitry to limit or restrict current flow in both directions.

The device 10 of the present invention preferably has a printed circuit board that is contained in or incorporated with the housing 21. Printed circuit construction allows multiple current limiters to be conveniently and compactly placed in housing 21 for connection to a multiple lead cable 13 for use with a multiple electrode assembly 11 or with a plurality of individual electrodes. The housing 21 has a connector for communication with the circuit board to accept the connector terminal 19 of the electrode assembly 11.

Figure 2:
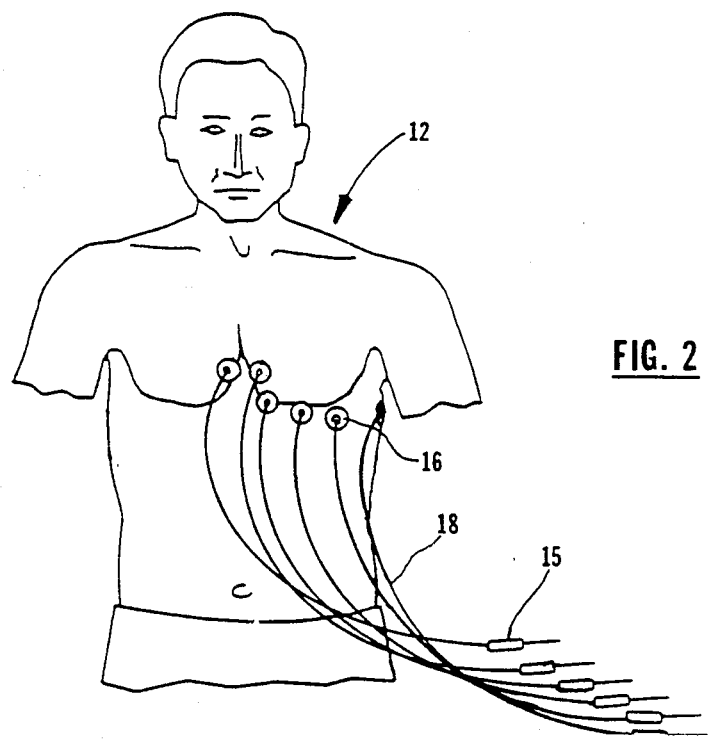
FIG. 2 shows the device of the present invention being connected in-line with each of a plurality of medical electrodes which are attached to the patient.

FIG. 2 shows a medical current limiting device 15 being used in-line with single cables 18 which extend from individual electrodes 16 placed on patient 12. The devices 15 may also be constructed utilizing printed circuit components or alternatively from non-printed circuit components.

1. Components

Figure 3:
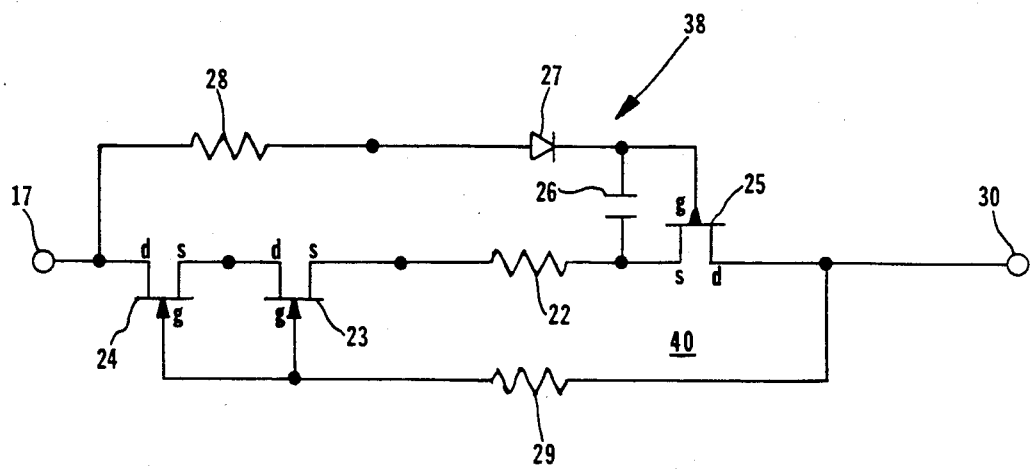
FIG. 3 shows the circuit diagram for the device of the present invention usable in pulsating d.c. systems for uni-directional current limiting.

FIG. 3 shows the medical current limiting device circuitry or circuitry section 38 mounted on or in circuit board 40, designed for limiting current in a single direction. The device comprises a first n-FET 24, a second n-FET 23, a first resistor 22, a p-FET 25, a capacitor 26 and a diode 27. The first and second n-FETs 24 and 23 are junction n-FETs and operate in a depletion mode. Each n-FET has a gate (g), source (s) and drain (d) terminal or electrode. Each is designed to have a low pinch-off voltage, for example between 0.5 and 1 volt. The first resistor 22 has a low resistance value, for example between 0.5 and 1.0 volt. The first resistor 22 has a value of from 5 to 15 kilo-ohms. This range of values will not add appreciable noise to the circuit or network 38. The first resistor 22 may also be variable between this range. The p-FET 25 is a junction p-FET and operates in a depletion mode. It also has gate, source and drain terminals and a pinch-off voltage of about 1 volt. The capacitor 26 in the circuit is non-polarized. Finally, the diode 27 has both an anode and a cathode.

2. Method of Interconnection

A. Uni-directional circuit section

Referring to FIG. 3, the drain of the first n-FET 24 is shown connected to a first external connection or lead 17. The gate of the first n-FET 24 is connected to a second external connection 30 located at the opposite end of the circuit 38. The drain of the second n-FET 23 is connected to the source of the first n-FET 24. The gate of the second n-FET 23 is also connected to the second external connection 30.

The first resistor 22 is connected in series to the second n-FET 23 at its source. The p-FET 25 is connected in series with the first resistor 22 at its source while its drain is connected to the second external connection 30. As shown, the gate of the p-FET 25 is connected to the first external connection 17.

The capacitor 26 is connected at one end between the first resistor 22 and the source of the p-FET 25 and at its other end between the gate of the p-FET 25 and the first external connection 17. The diode 27 is connected in series with the latter of the above-mentioned capacitor connections and the first external connection 17. Its cathode is aligned toward the capacitor connection and its anode is aligned toward the first external connection 17.

Relatively large resistors are prefereably provided in series with the connections of the gates of the n-FETs 23 and 24 and the p-FET 25 to their respective external connections 30 and 17. A second resistor 29 has a value of 1 mega-ohm, for example, and is placed in series with the connections of the gates of the first and second n-FET 24 and 23 to the second external connection 30. A third resistor 28 has a value of approximately 22 mega-ohms and is coupled in series between the anode of the diode 27 and the first external connection 17. The positioning of the second and third resistors 29 and 28 does not add noise to the network 38 since the signal flows through the much smaller first resistor 22.

B. Bi-directional and a.c. circuit

Figure 4:
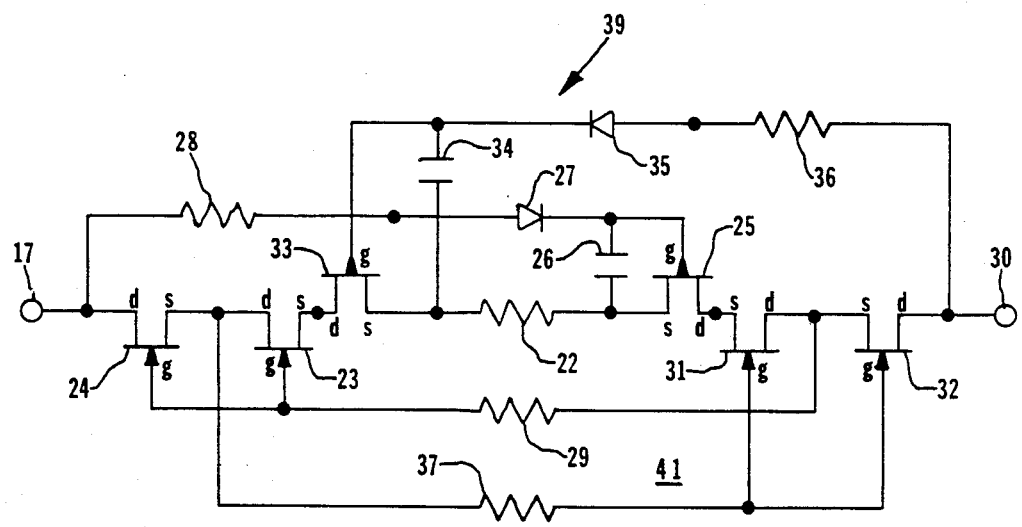
FIG. 4 shows the preferred embodiment of the circuitry for the device of the present invention useable for bi-directional current limiting purposes.

Referring to FIG. 4, the network 39 is shown mounted to or in circuit board 41 and is designed for bi-directional current limiting, for example in a.c. applications or where the potential for a positive voltage at external connection 30 exists. Electrical components equivalent to those comprising the circuit 38, shown in FIG. 3, are effectively here shown interconnected in a symmetrical "back-to-back" fashion. A third and fourth n-FET 31 and 32 are added in the circuit 39 and connected in series with the p-FET 25. The drain of the fourth n-FET 32 is connected to the second external connection 30. The gate of the fourth n-FET 32 is connected to the first external connection 17 through the first n-FET 24. The drain of the third n-FET 31 is connected to the source of the fourth n-FET 32. The source of the third n-FET 31 is connected to the drain of the first p-FET 25. The gate of the third n-FET 31 is also connected to the first external connection 17 through the first n-FET 24. A second p-FET 33 is connected in series with the first resistor 22 and the second n-FET 23. The second p-FET 33 is connected to the first resistor 22 at its source terminal, its drain is connected to the source of the second n-FET 23, and its gate is connected to the second external connection 30. A second capacitor 34 is connected to the gate of the second p-FET 33 at one end and to both the second p-FET 33 source and the first resistor 22 at its other end.

A second diode 35 is provided in circuit 39 for connection in series with the lead of the second capacitor 34 to the second p-FET 33 gate and the second external connection 30. Its cathode is aligned toward the second p-FET 33 gate. A fourth resistor 37 having a resistance of about 1 mega-ohms is connected at one end to the gates of the third and fourth n-FETs 31 and 32 and at its other end between the connection of the first n-FET 24 to the second n-FET 23. Also, a fifth resistor 36, having a resistance of approximately 22 mega-ohms is connected between the second diode 35 and the second external connection 30.

3. Behavior of the Circuit

Referring to FIG. 3, the circuit 38 limits current flow by sensing large voltage drops associated with high current flow. Current limitation is further enhanced by cascade or positive feedback design features and also by a positive voltage sensing design feature. A capacitive latching feature enables the positive voltage sensing means to remain activated through successive voltage decreases associated with pulsating d.c. current thus enabling the circuit 38 to maintain a low average current and reduce signal transients.

The device 38 limits current flow to a very low idle current of approximately 4 micro-amps upon detection of a current overload. The device 38 is also self-resetting. The device 38 does not introduce deleterious Johnson noise, phase shifts, frequency distortions or amplifier current noise to the electronic medical apparatus 14, and it does not cause a loss of common-mode rejection capabilities in the apparatus 14.

Assuming a positive voltage is applied at the first external connection 17, an increase in current will produce a voltage drop across the first resistor 22. The first resistor 22 value may be selected or adjusted to vary the voltage drop. Current limiting is directly proportional to resistance. The negative voltage from this drop, relative to the source of second n-FET 23 is sensed by the second n-FET 23 gate. The conduction channel of the second n-FET 23 is thereby depleted and current flow is restricted to a small leakage current which holds the gate negative.

The depletion of the second n-FET 23 increases its resistance which further drops the voltage relative to the source of the first n-FET 24. This further voltage drop is sensed by the gate of the first n-FET 24 which activates and depletes its channel thus further limiting current flow to a small, gate activating, leakage amount. The interaction of these two n-FETs 23 and 24, along with the first resistor 22, causes a cascading effect which increases the responsiveness of the circuit to limit current levels.

The gate of the first and second n-FETs 24 and 23 are connected adjacent to the second external connection 30 and far away from the positive voltage source at the first external connection 17 to gain as much potential difference for the gate terminals relative to their respective source terminals as possible. The second resistor 29 is connected between the gates of the first and second n-FETs 24 and 23 and the second external connection 30 to protect the gates from voltage breakdown.

The effect of the turn-off (depletion) of n-FETs 24 and 23 is to allow voltage at the first external connection 17 to rise. The positive voltage at the first external connection 17 routes to the gate of the p-FET 25 and depletes the p-FET 25 channel to further limit current flow. The depletion of the p-FET 25 further increases the voltage drop sensed by the gates of the n-FETs 24 and 25 which results in further depletion of the p-FET 25. This positive feedback lowers the current to a very low "idling" level, for example 4 micro-amps, even with high voltages. The p-FET 25 gate is connected adjacent to the first external connection 17 (and thus the positive voltage source) to maximize potential difference between the p-FET 25 gate and source terminals upon application of voltage. The third resistor 28 is connected between the gate electrode of the p-FET 25 and the second external connection 30 to protect the gate from voltage breakdown. Its location in the circuit 38 outside the normal pathway does not cause signal distortion.

A decreased voltage due to pulsating d.c. for example, can cause the p-FET 25 gate to deactivate resulting in momentary channel conduction. The capacitor 26 maintains charge on the gate so that it remains on during cyclic external voltage variations. The diode 27 prevents current from the capacitor 25 from draining back to the first external connection 17 and the voltage/current source.

Referring again to FIG. 4, the bi-directional and a.c. circuit 39 functions in the same manner as that described for the circuit 38 shown in FIG. 3. The circuit 39 has equivalent components arranged in a symmetrical manner to limit current flowing in either direction in the circuit 39. Thus, when a positive voltage is applied to second external connection 30, current will also be limited. The third and fourth n-FETs 31 and 32 sense voltage drops in the network 39 associated with high current flow from the second external connection 30 and limit current by the cascade mechanism. Positive voltage at the external connection 30 activates the p-FET 33 gate, subject to the capacitive latching of the second capacitor 34, to further limit current.

The symmetrical configuration of the circuit 39 also limits bi-directional current flow associated with polarity changes in alternating current. 120 volt alternating current oscillates between approximate peaks of positive and negative 170 volts. The circuit 39 limits current for both positive and negative swings of this voltage. The capacitive latching mechanism maintains charge on the first and second p-FET 25 and 33 gates throughout the low and negative portions of the a.c. waveform to keep current at a low and steady idling value in spite of a.c. polarity changes.

As many changes are possible to the embodiments of this invention utilizing the teachings thereof, the descriptions above, and the accompanying drawings should be interpreted in the illustrative and not the limited sense.

I claim:

1. A two terminal, bi-directional medical current limiter device for series use with an electrode connected to the first external terminal and an electro-medical diagnostic or therapeutic apparatus connected to the second external terminal, comprising:

a. a low resistance voltage dropping means connected between the first and second external terminals;
b. at least one first field effect transistor having a first gate and a first channel, said first channel being connected between the first external terminal and said voltage dropping means, said first gate being coupled in said device to limit conduction in said first channel during a current overload;
c. at least one second field effect transistor having a second gate and a second channel, said second channel being connected between the second external terminal and said voltage dropping means, said second gate being coupled in said device to limit conduction in said second channel during a current overload; and
d. first and second capacitive memory means, said first capacitive memory means being connected to said first gate, said second capacitive memory means being connected to said second gate, and said first and second capacitive memory means being arranged to hold said first and second field effect transistors in a conduction-limiting mode during a current overload.

2. The medical current limiter device of claim 1, wherein said at least one first and second field effect transistors include a p-channel field effect transistor, said gate of said first p-channel field effect transistor being connected between the second external terminal and said voltage dropping means, and said gate of said second p-channel field effect transistor being connected between the first external terminal and said voltage dropping means.

3. A two terminal, bi-directional medical current limiter device for series use with an electrode connected to the first external terminal and an electro-medical diagnostic or therapeutic apparatus connected to the second external terminal, comprising:
a. a low resistance voltage dropping means connected between the first and second external terminals;
b. at least one first p-channel field effect transistor having a first gate and a first channel, said first channel being connected between the first external terminal and said voltage dropping means, said first gate being connected in said device to limit conduction in said first channel;
c. at least one second n-channel field effect transistor having a second gate and a second channel, said second channel being connected between the second external terminal and said voltage dropping means, said second gate being connected in said device to limit conduction in said second channel; and
d. first and second p-channel field effect transistors having a gate and a channel, said channel of said first p-channel field effect transistor being connected between said voltage dropping means and the second external terminal, said channel of said second p-channel field effect transistor being connected between said voltage dropping means and the first external terminal, said gate of said first p-channel field effect transistor being connected between the first external terminal and said first channel, and said gate of said second p-channel field effect transistor being connected between the second external terminal and said second channel, whereby said gates of said p-channel field effect transistors are remotely connected in said medical current limiter device to gain maximum potential difference between said gates and their respective said channels.

4. The medical current limiter device of claim 3, wherein said first gate is connected between the second external terminal and said voltage dropping means, and wherein said second gate is connected between the first external terminal and said voltage dropping means.

5. A two terminal, bi-directional medical current limiter device for series use with an electrode connected to the first external terminal and an electro-medical diagnostic or therapeutic apparatus connected to the second external terminal, comprising:
a. a low resistance voltage dropping means connected between the first and second external terminals;
b. at least one first n-channel field effect transistor having a first gate and a first channel, said first channel being connected between the first external terminal and said voltage dropping means; and
c. at least one second n-channel field effect transistor having a second gate and a second channel, said second channel being connected between the second external terminal and said voltage dropping means, said second gate being connected between said first channel and the first external terminal immediately adjacent said first external terminal, said first gate being connected between said second channel and the second external terminal immediately adjacent said second external terminal, whereby said gates of said n-channel field effect transistors are remotely connected in said medical current limiter device to gain maximum potential difference between said gates and their respective said channels.

6. A two terminal, bi-directional medical current limiter device for series use with an electrode connected to the first external terminal and an electro-medical diagnostic or therapeutic apparatus connected to the second external terminal, comprising:
a. a low resistance voltage dropping means connected between the first and second external terminals;
b. at least one first field effect transistor having a first gate and a first channel, said first channel being connected between the first external terminal and said voltage dropping means, said first gate being coupled in said device to limit conduction in said first channel during a current overload;
c. at least one second field effect transistor having a second gate and a second channel, said second channel being connected between the second external terminal and said voltage dropping means, said second gate being coupled in said device to limit conduction in said second channel during a current overload;
d. first and second capacitors, said first capacitor being connected to said first gate, said second capacitor being connected to said second gate, and said first and second capacitors being arranged in parallel with said respective gates and channels to hold said first and second field effect transistors in a conduction-limiting mode during a current overload; and
e. first and second diodes connected in series with said respective gates to prevent the charge from said respective capacitors from draining to the first and second external terminals.

* * * * *